March 17, 1953     R. E. DEVESON     2,631,466
RACK AND PINION DEVICE
Filed Dec. 14, 1950
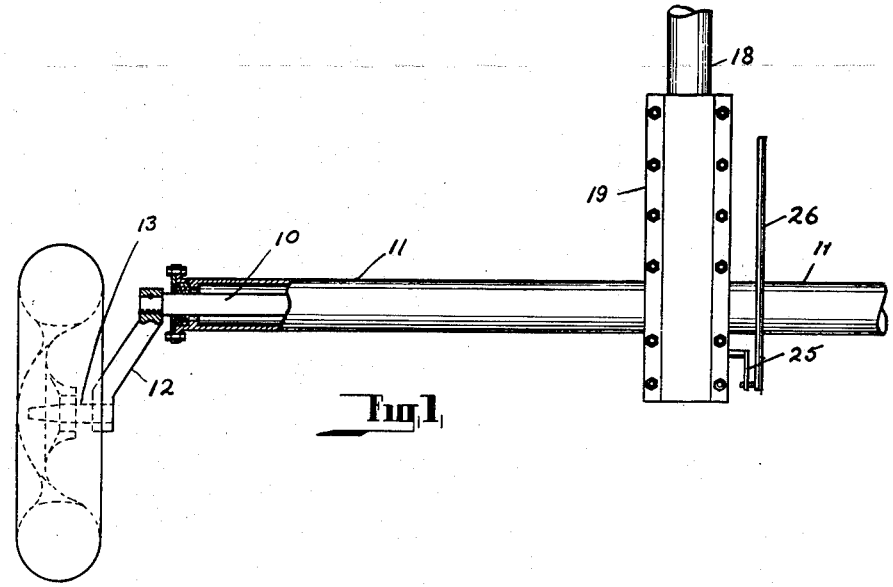
INVENTOR
ROBERT ERNEST DEVESON
By Linton and Linton
ATTORNEYS Patented Mar. 17, 1953

2,631,466

UNITED STATES PATENT OFFICE 2,631,466

RACK AND PINION DEVICE

Robert Ernest Deveson, East Fremantle, Western Australia, Australia

Application December 14, 1950, Serial No. 200,789
In Australia January 18, 1950

2 Claims. (Cl. 74—422)

This invention relates to improvements in caravans and the like vehicles.

Caravans as at present constructed have one serious disadvantage, and that is that when they reach an area where they are to be parked, there are no simple means available for taking the weight off the wheels and thereby giving the body the stability desirable in such circumstances.

One object of the present invention is so to construct the undercarriage of caravans which enables these vehicles to be adjusted when they reach an area where they are to be parked so that the body actually rests on the ground, thereby taking the weight off the wheels and making them much more convenient due to the absence of steps.

Another object of the invention is so to construct the undercarriage to provide efficient and improved springing in a way which is adjustable having regard to the road conditions.

The invention consists broadly of forming the undercarriage of caravans and the like vehicles so that each axle carrying a wheel is connected to a crank arm that in turn is connected to a torque shaft that is engaged by a toothed wheel provided with means for operating it whereby the axle and the wheel can be raised or lowered at will.

The invention will, however, more readily be understood by reference to the accompanying drawings, in which:

Figure 1 is a plan of the relevant part of one side of the undercarriage, this being partly in section;

Fig. 2 is a sectional side elevation showing the means used to operate the toothed wheel controlling the torque shafts, whilst Fig. 3 is a detailed view showing the cam for releasing the locking block.

As shown in these drawings, on each side there is a torque shaft 10 rotating inside a housing 11, appropriate bearings being provided. At the end each torque shaft is connected to a crank or arm 12 which in turn is connected to a stub axle 13. The torque shafts 10 are splined at their ends, registering with corresponding contours in a ratchet wheel 14. This is a wheel of sufficient width so as to accommodate the splined ends of the shafts, and it is provided with a plurality of ratchet teeth which are engaged by corresponding ratchet teeth in a sliding rack member 15. This sliding rack member 15 may be engaged by a sliding block 16 with the necessary extension to engage the sliding rack, and this sliding block in turn is engaged by a hydraulic piston 17 operating in a hydraulic cylinder 18.

The upper part of the structure is covered by a shrouding plate member 19 inside which the rack 15 operates, but such plate member is of course open to provide for the necessary movement and for the engagement of the ratchet teeth previously referred to.

Also adapted to engage the teeth on the ratchet wheel 14 are teeth on a locking block 20. This has a concave face on which are formed ratchet teeth, all of which are adapted simultaneously to engage ratchet teeth on the ratchet wheel 14.

There are springs 21 that normally hold the teeth of the ratchet block 20 in engagement with the teeth of the ratchet wheel 14. The ratchet block, however, is provided with an opening or passage 22 in which is adapted to operate a cam member 23. This cam member extends in the form of a shaft 24 through the housing and is connected to a lever 25 that in turn is pivoted to a releasing lever 26.

The construction described operates in the following manner:

Assuming that the body of the carvan is sitting on the ground and that it is desired to make the adjustment for normal running, which in effect is to change the position of the crank arms 12 so that they are approximately horizontal to the ground. To achieve this, it is necessary to move the torque shafts 10 so that the crank arms 12 are turned to the required extent. This is done by movement of the ratchet wheel 14. This in turn is moved by operation of the rack 15 operating through the agency of the hydraulic piston 17. In practice of course the hydraulic pump is simply operated until enough oil or fluid is pumped into the cylinder to move the piston 17 to the extent necessary to operate the rack 15 to turn the ratchet wheel through the required angle. Whilst this is going on, the ratchet teeth on the ratchet wheel are riding over the ratchet teeth in the ratchet block 20. When, however, the hydraulic cylinder is operated no further, backward movement of the assembly is prevented by the interlocking of the ratchet teeth on the wheel and block, so that during normal running the torque shafts are firmly locked at their inner ends.

When it is desired to lower the undercarriage, and with it of course the caravan body, the releasing lever 26 is moved and this causes operation of the cam 23 inside the opening 22 of the ratchet block 20, so serving to pull the ratchet block out of engagement with the teeth and allowing the body to move down by its own weight, cushioned preferably by the valved control of the hydraulic apparatus.

Where bad road conditions are met with, it will occasionally be desirable to elevate the stub axles higher than normal. This is easily done, although it has the effect of to some extent reducing the springing of the undercarriage.

I claim:

1. A mechanism for raising and lowering crank arm supported vehicle wheels comprising a torque shaft fixedly connected to one end of the crank arm, a pinion fixedly connected to said shaft for rotating the same, a rack in meshed engagement with said pinion for rotating same, hydraulic means for reciprocating said rack when desired, a ratchet block having a concave face with teeth formed thereon for normally engaging the teeth of said pinion, means tending to move said ratchet block into engagement with said pinion, said block having an opening therein, a rotatably mounted rod having a cam shaped end extending into said block opening for withdrawing said block from said pinion on rotation of said rod and means for rotating said rod as desired.

2. A mechanism for raising and lowering crank arm supported vehicle wheels comprising a torque shaft fixedly connected to one end of the crank arm, a casing having a guideway formed therein, a rack slidably mounted within said guide, an annular casing connected to said first mentioned casing and having said shaft extending therein, a pinion fixedly mounted on said shaft within said annular casing and being in meshed engagement with said rack for being rotated thereby, said annular casing having a recess formed in the periphery thereof, a ratchet block slidably mounted within said casing recess and having a concave toothed face normally in meshed engagement with said pinion, resilient means mounted in said recess and tending to slide said block towards said pinion, means for sliding said block when desired to and from said pinion and hydraulic means for sliding said rack when desired.

ROBERT ERNEST DEVESON.

REFERENCES CITED

The following references are of record in the file of this patent:

UNITED STATES PATENTS

| Number | Name | Date |
|---|---|---|
| 1,615,820 | Beeson | Feb. 1, 1927 |
| 2,227,762 | Ronning | Jan. 7, 1941 |
| 2,251,893 | Snell | Aug. 5, 1941 |

FOREIGN PATENTS

| Number | Country | Date |
|---|---|---|
| 650,826 | Germany | Oct. 2, 1937 |